UNITED STATES PATENT OFFICE.

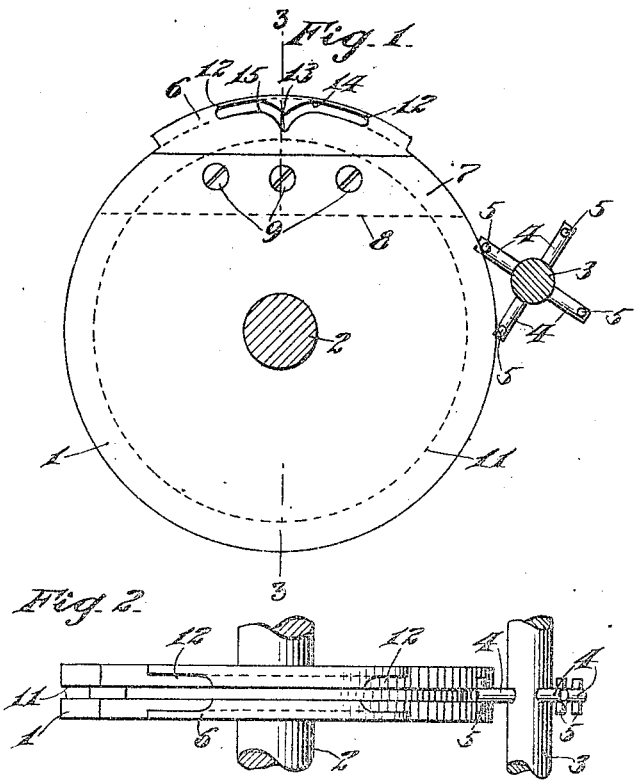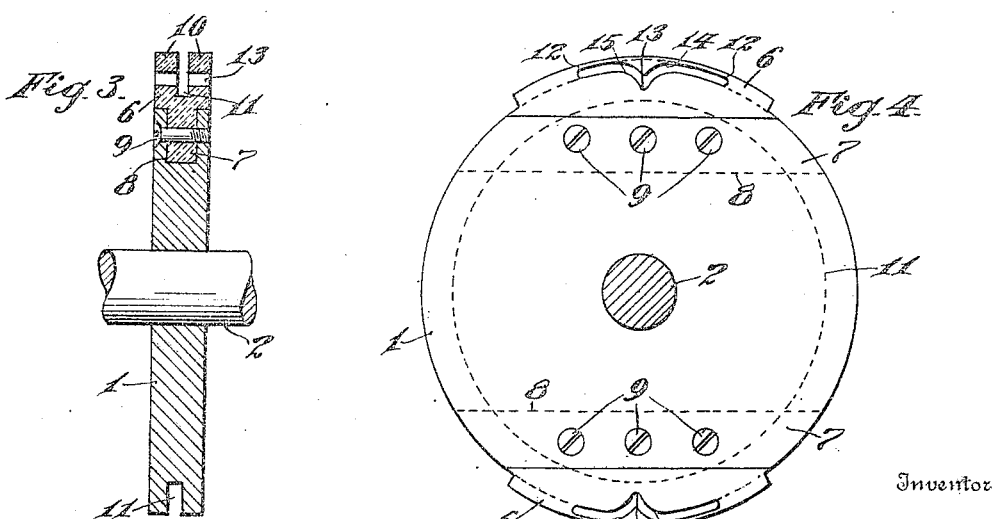

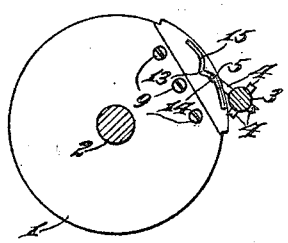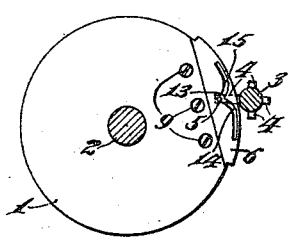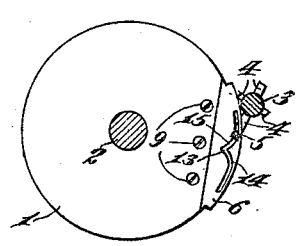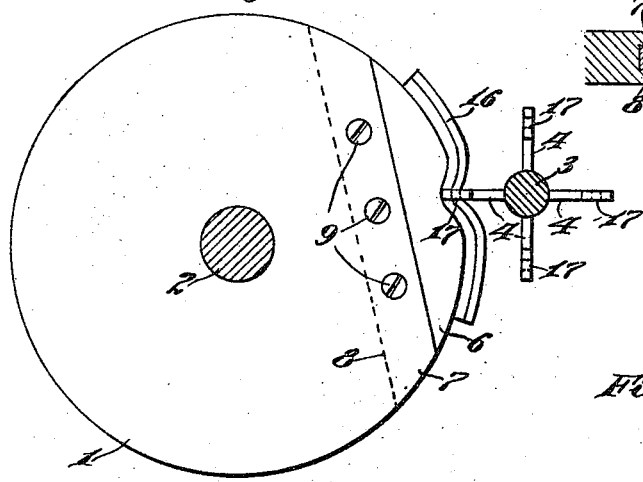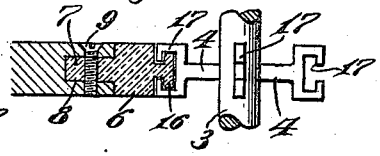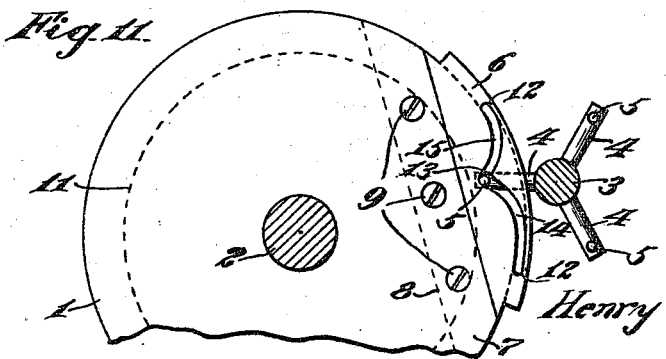

HENRY J. ANDRÉ, OF PHILADELPHIA, PENNSYLVANIA.

MECHANICAL MOVEMENT.

945,835.  Specification of Letters Patent.  Patented Jan. 11, 1910.

Application filed April 8, 1909. Serial No. 488,665.

*To all whom it may concern:*

Be it known that I, HENRY J. ANDRÉ, a subject of the Emperor of Germany, residing at Philadelphia, in the county of Philadelphia and State of Pennsylvania, have invented certain new and useful Improvements in Mechanical Movements, of which the following is a specification.

My invention relates to an improved mechanical movement, the object of the invention being to transmit from a continuously revolving driving element, an intermittent partial rotary movement to a driven element.

With this object in view, the invention consists in the rotary driving element having a cam, and a rotary driven element having a series of radially disposed pins, constructed to be engaged in turn by said cam to transmit to the driven element, an intermittent partial rotary movement.

In the accompanying drawings, Figure 1, is a view in side elevation illustrating one form of my invention. Fig. 2, is an edge view thereof. Fig. 3, is a view in section on the line 3—3 of Fig. 1. Fig. 4, is a view in elevation of a modification. Figs. 5, 6 and 7, are views illustrating three positions of the coöperating elements during one intermittent movement of the driven element. Figs. 8, 9, 10 and 11, are views illustrating modifications.

1 represents a disk constituting the rotary driving element, which may be secured upon a shaft 2, driven from any source of power.

3 represents the rotary driven element, which constitutes a shaft or journal, transmitting motion to any desired operating means not shown, and having a series of radially supported arms 4, in the ends of which cross pins 5 are removably secured.

The driving element 1 is preferably of hard metal, and provided with a removable section 6, which latter is preferably of glass. This section 6 may be secured to the element 1 in a great many different ways. I have illustrated one method in which the section 6 has a tongue 7, to enter a groove 8 in element 1, and be secured by means of screws 9, which will enable the section 6 to be removed and easily replaced in the event of wear or injury. This removable section 6 of the driving element is made with parallel flanges 10, located upon opposite sides of a groove 11 in the periphery of the rotary element, said groove extending entirely around the rotary element for the accommodation of the extreme ends of arms 4. These flanges 10 are grooved at their ends as shown, constituting entrances and exits 12, for the reception of the pins 5 on arms 4, and from said entrances or exits, flanges are grooved or slotted as shown, to form the cam groove 13, more fully hereinafter described, to transmit to the driven element 3, through the medium of arms 4, the intermittent partial rotary movement.

Fig. 5, illustrates the position of parts. As the driving element 1 begins to transmit the intermittent movement to the driven element 3, it will be observed that the pin 5 of one of the arms 4 is engaged by the cam face 14, when the rotary element will turn the arm to the position shown in Fig. 6. A continued movement of element 1 will bring cam face 15 into contact with the pin 5, and this cam face will move the arm 4 and the element 3 to the position shown in Fig. 7, when the rotary element 1 will move out of engagement with the pin 5, and as it returns, the cam engaging grooved portion toward the driven element, the next arm 4, on the driven element, will be in position to be operated as the one above described, and the length of these cam grooves, and the length of movement transmitted to the driven element, will of course be mathematically figured out, so as to transmit at each revolution of the driving element, a ninety degree movement of the driven element.

Instead of having cam grooves in the driving element, I might employ a cam flange or track 16, T-shaped in cross section as shown in Figs. 8 and 9, engaging in recessed heads 17 on the arms 4 of the driven element, which operation would be the same as that above described, and I do not limit myself to any particular number of arms, or the length of movement transmitted by the revolving elements, as I may employ only three arms 4 as illustrated in Fig. 11, I therefore do not limit myself to the precise construction shown, to the number of arms on the driven element, to the materials used, nor to the exact construction illustrated, but consider myself at liberty to make such changes and alterations as fairly fall within the spirit and scope of the claims.

Having thus described my invention what I claim as new and desire to secure by Letters Patent is:

1. A mechanical movement, comprising a continuously revolving driving element, a rotary driven element, arms on the driven element, said driving element and said driven element being constructed to turn in opposite directions, but in the same plane, a cam on the driving element constructed and adapted to engage said arms, and transmit to said driven element an intermittent partial rotary movement.

2. A mechanical movement, comprising a continuously revolving driving element, a rotary driven element, radial arms on the driven element, said driving element being grooved to receive said arms, a double cam on said driving element constructed and adapted to engage but a single arm at each revolution of the driving element, and transmit to the driven element an intermittent partial rotary movement.

3. A mechanical movement, comprising a continuously revolving driving element having a peripherial double cam, a rotary driven element, and radial members on the driven element constructed and adapted to be engaged by the double cam on the driving element, whereby an intermittent partial rotary movement is transmitted to said driven element by said cam.

4. A mechanical movement, comprising a continuously revolving driving element, having a peripheral double cam, a driven element, radial members on the driven element, and cross pins on said radial members constructed and adapted to be engaged by said double cam, whereby an intermittent partial rotary movement is transmitted to the driven element.

5. A mechanical movement, comprising a continuously revolving driving element, a rotary driven element, radial arms on the driven element, and a double cam, substantially as set forth, on the driving element, constructed and adapted to engage but a single arm at each revolution of the driving element, and transmit to the driven element, an intermittent partial rotary movement.

6. A mechanical movement, comprising a continuously revolving driving element, a rotary driven element, radial arms on the driven element, cross pins on said arms, said driving element having a peripherial groove to accommodate the ends of said arms, and said driving element having double cam grooves, substantially as set forth, to receive the pins on said arms, and transmit to said driven element, at each revolution of the driving element, an intermittent partial rotary movement.

In testimony whereof I have signed my name to this specification in the presence of two subscribing witnesses.

HENRY J. ANDRÉ.

Witnesses:
R. H. KRENKEL,
J. A. L. MULHALL.